(12) United States Patent
Bacioccola

(10) Patent No.: US 8,909,150 B2
(45) Date of Patent: Dec. 9, 2014

(54) METHOD, APPARATUS, AND COMPUTER PROGRAM PRODUCT FOR SHORT-RANGE WIRELESS COMMUNICATION

(75) Inventor: Andrea Bacioccola, Helsinki (FI)

(73) Assignee: Nokia Corporation, Espoo (FI)

( * ) Notice: Subject to any disclaimer, the term of this patent is extended or adjusted under 35 U.S.C. 154(b) by 191 days.

(21) Appl. No.: 13/420,228

(22) Filed: Mar. 14, 2012

(65) Prior Publication Data

US 2013/0244578 A1  Sep. 19, 2013

(51) Int. Cl.
*H04B 7/00* (2006.01)
(52) U.S. Cl.
USPC .......................................... 455/41.2; 455/41.1
(58) Field of Classification Search
USPC ................. 455/41.1, 41.2, 425, 574; 307/104
See application file for complete search history.

(56) References Cited

U.S. PATENT DOCUMENTS

| 7,720,438 | B2 * | 5/2010 | Rowse | 455/41.1 |
| 7,925,215 | B2 * | 4/2011 | Takayama | 455/41.2 |
| 8,284,061 | B1 * | 10/2012 | Dione | 340/572.1 |
| 2005/0020322 | A1 * | 1/2005 | Ruuska et al. | 455/574 |
| 2008/0081608 | A1 * | 4/2008 | Findikli et al. | 455/425 |
| 2008/0296978 | A1 * | 12/2008 | Finkenzeller et al. | 307/104 |
| 2009/0108805 | A1 * | 4/2009 | Liu et al. | 320/108 |
| 2012/0315846 | A1 * | 12/2012 | Gartner et al. | 455/41.1 |

* cited by examiner

*Primary Examiner* — Temesgh Ghebretinsae
*Assistant Examiner* — Raj Chakraborty
(74) *Attorney, Agent, or Firm* — Locke Lord LLP

(57) ABSTRACT

Example method, apparatus, and computer program product embodiments are disclosed to enable remote wireless control of an electronic device while in standby mode. Example embodiments of the invention include a method comprising the steps of transmitting, by a device, short-range wireless polling signals via a short-range wireless interface according to a first poll interval; determining whether the device is active, or in a stand-by, low power, idle, or sleep mode state; and when the device is determined to be in a stand-by, low power, idle, or sleep mode state, causing the device to enter into a polling mode for transmitting short-range wireless polling signals via a short-range wireless interface according to a second poll interval that may be the same or different from the first poll interval and ignoring received short-range wireless response signals.

11 Claims, 9 Drawing Sheets

400

STEP 402: TRANSMITTING, BY A DEVICE, SHORT-RANGE WIRELESS POLLING SIGNALS VIA A SHORT-RANGE WIRELESS INTERFACE ACCORDING TO A FIRST POLL INTERVAL;

STEP 404: DETERMINING WHETHER THE DEVICE IS ACTIVE, OR IN A STAND-BY, LOW POWER, IDLE, OR SLEEP MODE STATE;

STEP 406: WHEN THE DEVICE IS DETERMINED TO BE IN A STAND-BY, LOW POWER, IDLE, OR SLEEP MODE STATE, CAUSING THE DEVICE TO ENTER INTO A POLLING MODE FOR TRANSMITTING SHORT-RANGE WIRELESS POLLING SIGNALS VIA A SHORT-RANGE WIRELESS INTERFACE ACCORDING TO A SECOND POLL INTERVAL THAT MAY BE THE SAME OR DIFFERENT FROM THE FIRST POLL INTERVAL AND IGNORING RECEIVED SHORT-RANGE WIRELESS RESPONSE SIGNALS.

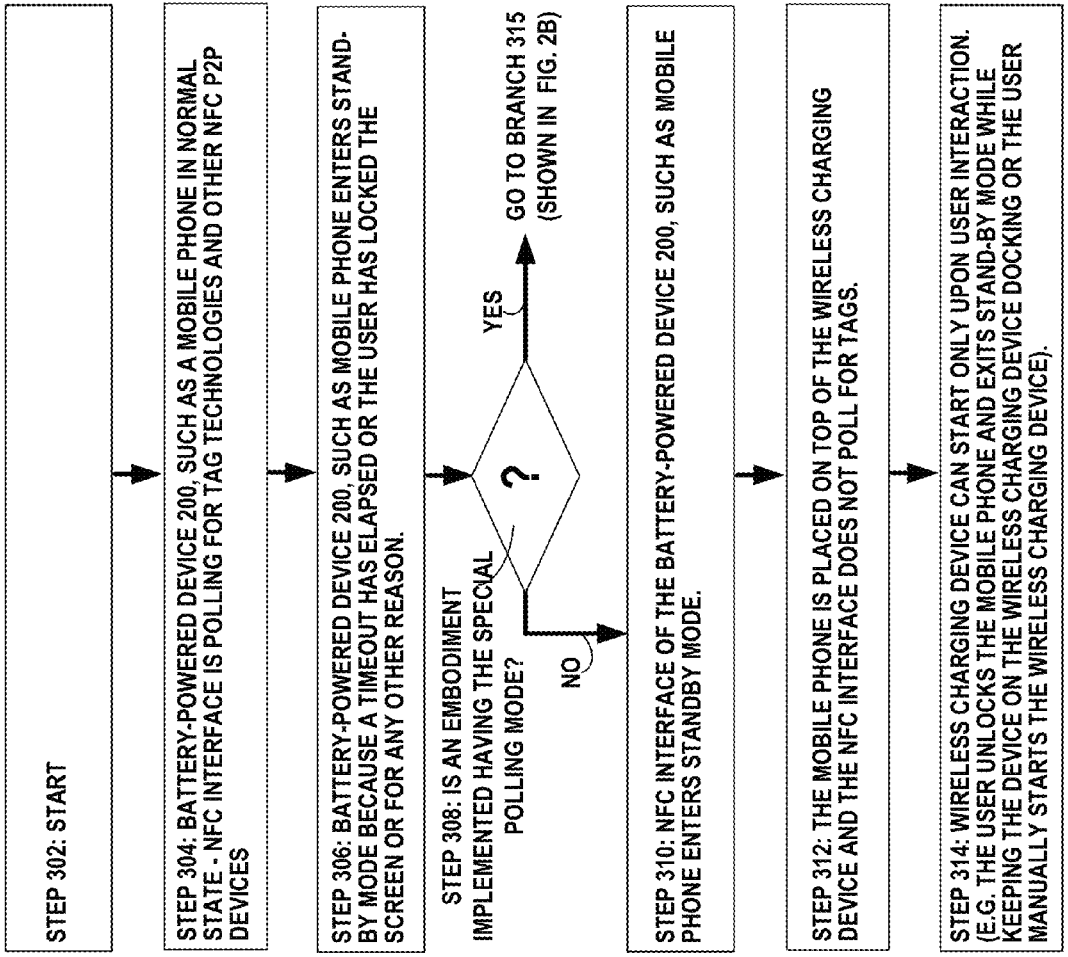

FIG. 2B

BRANCH 315

STEP 308: IS AN EMBODIMENT IMPLEMENTED HAVING THE SPECIAL POLLING MODE?

YES

STEP 316: NFC INTERFACE OF THE BATTERY-POWERED DEVICE 200, SUCH AS MOBILE PHONE ENTERS A SPECIAL MODE WHERE IT POLLS FOR NFC TAGS AND OPTIONALLY IT MAY INCREASE THE POLLING LOOP OR REDUCE THE TAG TECHNOLOGIES IT POLLS FOR IN ORDER TO SAVE BATTERY.

STEP 318: THE BATTERY-POWERED DEVICE 200, SUCH AS MOBILE PHONE IS PLACED ON TOP OF THE WIRELESS CHARGING DEVICE AND NFC TAG 75 EXCITATION IS TRIGGERED, INDUCING CURRENT IN THE NFC TAG 75, CAUSING THE WIRELESS CHARGING DEVICE 100 TO RESPOND BY PROVIDING WIRELESS POWER 110.

STEP 320: THE RECEIVED TAG CONTENT 114 IS BLOCKED BY THE GATE 78 FROM BEING DELIVERED TO THE CONTROLLER 20 IN THE BATTERY-POWERED DEVICE 200 AND THUS, THE BATTERY-POWERED DEVICE 200, SUCH AS MOBILE PHONE CAN CONTINUE STAYING IN SLEEP MODE.

STEP 322: WIRELESS CHARGING DEVICE STARTS WITHOUT USER INTERACTION AND WITH THE MINIMUM POSSIBLE POWER CONSUMPTION (ON THE WIRELESS CHARGING DEVICE SIDE), IN FACT THE WIRELESS CHARGING DEVICE MAY INITIALLY BE COMPLETELY OFF.

STEP 324: WIRELESS CHARGING CAN BE AUTOMATICALLY STOPPED AS SOON AS THE BATTERY-POWERED DEVICE 200, SUCH AS MOBILE PHONE IS REMOVED FROM THE CHARGER AND TAG IS NOT READ ANYMORE.

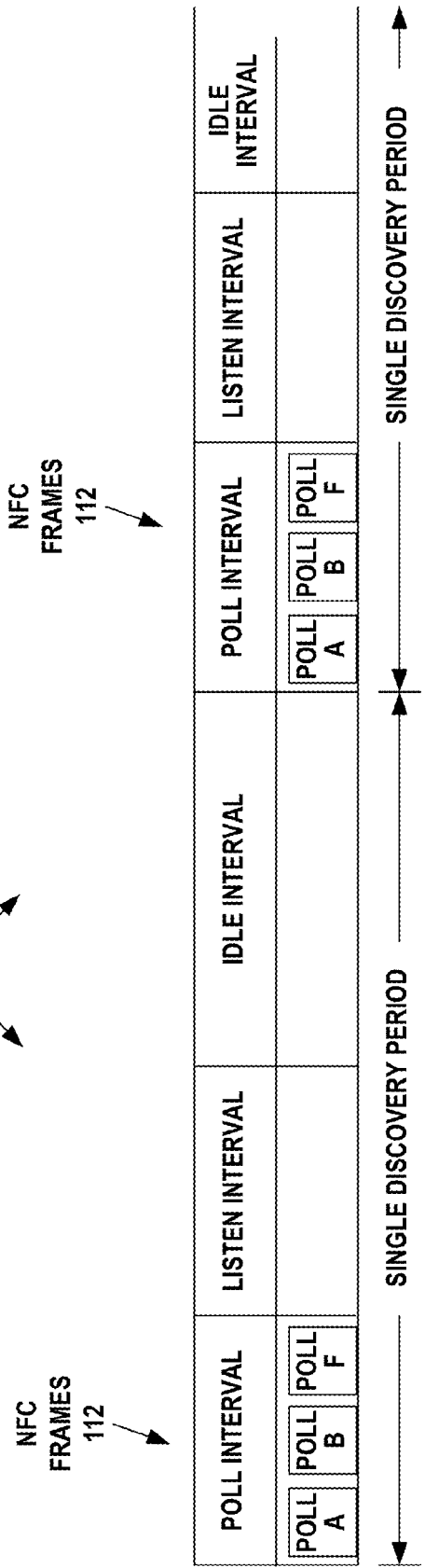

STEP 402: TRANSMITTING, BY A DEVICE, SHORT-RANGE WIRELESS POLLING SIGNALS VIA A SHORT-RANGE WIRELESS INTERFACE ACCORDING TO A FIRST POLL INTERVAL;

STEP 404: DETERMINING WHETHER THE DEVICE IS ACTIVE, OR IN A STAND-BY, LOW POWER, IDLE, OR SLEEP MODE STATE;

STEP 406: WHEN THE DEVICE IS DETERMINED TO BE IN A STAND-BY, LOW POWER, IDLE, OR SLEEP MODE STATE, CAUSING THE DEVICE TO ENTER INTO A POLLING MODE FOR TRANSMITTING SHORT-RANGE WIRELESS POLLING SIGNALS VIA A SHORT-RANGE WIRELESS INTERFACE ACCORDING TO A SECOND POLL INTERVAL THAT MAY BE THE SAME OR DIFFERENT FROM THE FIRST POLL INTERVAL AND IGNORING RECEIVED SHORT-RANGE WIRELESS RESPONSE SIGNALS.

STEP 452: RECEIVING A SHORT-RANGE WIRELESS POLLING SIGNAL VIA A SHORT-RANGE WIRELESS INTERFACE;

STEP 454: INITIATING TRANSMISSION OF WIRELESS POWER IN RESPONSE TO THE RECEIPT OF THE SHORT-RANGE WIRELESS POLLING SIGNAL.

METHOD, APPARATUS, AND COMPUTER PROGRAM PRODUCT FOR SHORT-RANGE WIRELESS COMMUNICATION

FIELD

The field of the invention relates to wireless communication, and more particularly to short-range wireless polling of electronic devices.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHz/1.8 GHz bands in Europe and at 850 MHz and 1.9 GHz in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Example method, apparatus, and computer program product embodiments are disclosed to enable remote wireless control of an electronic device, such as a wireless charging device.

An example embodiment of the invention includes a method comprising:
transmitting, by a device, short-range wireless polling signals via a short-range wireless interface according to a first poll interval;
determining whether the device is active, or in a stand-by, low power, idle, or sleep mode state; and
when the device is determined to be in a stand-by, low power, idle, or sleep mode state, causing the device to enter into a polling mode for transmitting short-range wireless polling signals via a short-range wireless interface according to a second poll interval that may be the same or different from the first poll interval and ignoring received short-range wireless response signals.

An example embodiment of the invention includes a method comprising:
receiving a short-range wireless polling signal via a short-range wireless interface; and
initiating transmission of wireless power in response to the receipt of the short-range wireless polling signal.

An example embodiment of the invention includes an apparatus comprising:
at least one processor;
at least one memory including computer program code;
the at least one memory and the computer program code configured to, with the at least one processor, cause the apparatus at least to:
transmit short-range wireless polling signals via a short-range wireless interface according to a first poll interval;
determine whether the apparatus is active, or in a stand-by, low power, idle, or sleep mode state; and
when the apparatus is determined to be in a stand-by, low power, idle, or sleep mode state, cause the apparatus to enter into a polling mode for transmitting short-range wireless polling signals via a short-range wireless interface according to a second poll interval that may be the same or different from the first poll interval and ignoring received short-range wireless response signals.

An example embodiment of the invention includes an apparatus comprising:
at least one processor;
at least one memory including computer program code;
the at least one memory and the computer program code configured to, with the at least one processor, cause the apparatus at least to:
receive a short-range wireless polling signal via a short-range wireless interface; and
initiate transmission of wireless power in response to the receipt of the short-range wireless polling signal.

An example embodiment of the invention includes a computer program product comprising computer executable program code recorded on a computer readable non-transitory storage medium, the computer executable program code comprising:
code for transmitting, by a device, short-range wireless polling signals via a short-range wireless interface according to a first poll interval;
code for determining whether the device is active, or in a stand-by, low power, idle, or sleep mode state; and
code for, when the device is determined to be in a stand-by, low power, idle, or sleep mode state, causing the device to enter into a polling mode for transmitting short-range wireless polling signals via a short-range wireless interface according to a second poll interval that may be the same or different from the first poll interval and ignoring received short-range wireless response signals.

An example embodiment of the invention includes a computer program product comprising computer executable program code recorded on a computer readable non-transitory storage medium, the computer executable program code comprising:
code for receiving a short-range wireless polling signal via a short-range wireless interface; and
code for initiating transmission of wireless power in response to the receipt of the short-range wireless polling signal.

The resulting embodiments enable remote wireless control of an electronic device, such as a wireless charging device.

DESCRIPTION OF THE FIGURES

FIGS. 2A and 2B are an example flow diagram of example operational steps of an example embodiment of the method carried out by the rechargeable battery-powered device of FIG. 1, according to an embodiment of the present invention.

FIG. 3 illustrates an example embodiment of a polling sequence of near field communication message frames of FIG. 1A, in accordance with example embodiments of the invention.

FIG. 4A is an example flow diagram 400 of example operational steps of an example embodiment of the method carried out by the rechargeable battery-powered device of FIG. 1A, according to an embodiment of the present invention.

FIG. 4B is an example flow diagram 450 of example operational steps of an example embodiment of the method carried out by the wireless charging device of FIG. 1A, according to an embodiment of the present invention.

DISCUSSION OF EXAMPLE EMBODIMENTS OF THE INVENTION

In an example embodiment of the invention, a wireless charging device will be switched ON in response to a rechargeable battery-powered device such as a mobile phone being placed on top of the wireless charging device, without requiring any mechanical switch, such as a weight sensor. In an example embodiment of the invention, communication provided by a short-range wireless interface of the battery-powered device, such as an NFC interface circuit, may cause switching ON of the wireless charging device when the user brings the two devices into close proximity with their embedded NFC interfaces. In an example embodiment of the invention, the NFC interface of the rechargeable battery-powered device is in a state where it polls for NFC tags. In an example embodiment of the invention, the NFC polling continues even when the rechargeable battery-powered device enters stand-by, low power, idle, or sleep mode.

In an example embodiment of the invention, NFC is used to trigger activation, such as switching power on other devices using the NFC polling operation, in situation where the rechargeable battery-powered device, such as a mobile phone, is in sleep state (for example when the display screen is not illuminated i.e. black).

In an example embodiment of the invention, the rechargeable battery-powered device such as a mobile phone may enter a state where the NFC interface of the rechargeable battery-powered device polls for certain technologies without delivering the results of the polling to the operating system or higher software levels.

In an example embodiment of the invention, the rechargeable battery-powered device may cause activation of operation on another device, such as waking up a wireless charging device, by polling/reading an associated NFC tag.

In an example embodiment of the invention, the NFC interface of the rechargeable battery-powered device enters a state wherein the polling loop for NFC technologies occurs according to the policies set in the device in terms of polling interval, frequency, and technologies for which to poll. In an example embodiment of the invention, the actual data being read from the NFC tag is ignored and the NFC interface of the rechargeable battery-powered device does not wake up the main operating system.

In an example embodiment of the invention, the wireless charging may be stopped as soon as the rechargeable battery-powered device is removed from the wireless charging device. In an example embodiment of the invention, the charger may determine that its tag has not been read/polled within a certain period of time, which may be predefined. This allows very efficient power consumption.

Figure 1A:
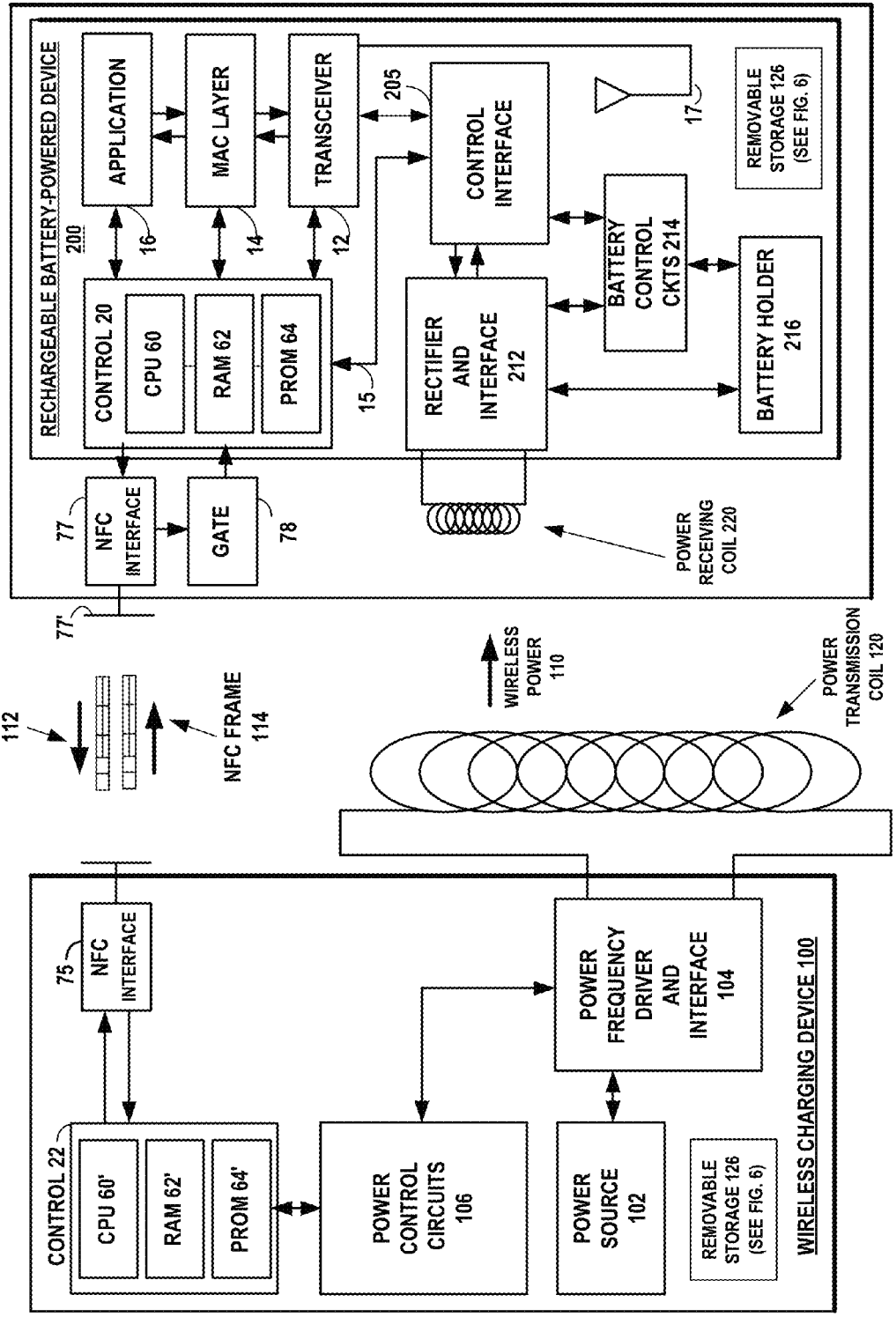
FIG. 1A illustrates an example embodiment of a rechargeable battery-powered device equipped with an NFC short-range wireless interface, transmitting an NFC short-range wireless polling signal to a wireless charging device equipped with its own NFC short-range wireless interface, to trigger the wireless charging device to provide power to the rechargeable battery-powered device, wherein the rechargeable battery-powered device has entered a special stand-by, low power, idle, or sleep mode state wherein its NFC short-range wireless interface polls for NFC tag technologies from the wireless charging device, but the responsive NFC signals returned to the NFC short-range wireless interface of the rechargeable battery-powered device, are discarded, in accordance with example embodiments of the invention.

FIG. 1A illustrates an example embodiment of a rechargeable battery-powered device 200 equipped with an NFC short-range wireless interface 77, transmitting an NFC short-range wireless polling signal 112, via its antenna 77', to a wireless charging device 100 equipped with its own NFC short-range wireless interface 75. NFC technology is an extension of the ISO/IEC 14443 proximity-card standard for contactless smartcards and radio frequency ID (RFID) devices, which combines the interface of a contactless smart-card and an RFID reader into a single device, and uses the ISO/IEC 18092 NFC communication standard to enable two-way communication in peer to peer mode. According to embodiments of the present invention, the NFC polling signal 112 can be any type f near field communication signal, such as RFID reader interrogation signal. The NFC short-range wireless polling signal 112 triggers the wireless charging device 100 to initiate operation for providing wireless power 110 to the rechargeable battery-powered device 200. In an example embodiment of the invention, the rechargeable battery-powered device 200 has entered a special stand-by, low power, idle, or sleep mode state before it has been placed within close proximity of the wireless charging device, wherein its NFC short-range wireless interface 77 is configured to poll for NFC tag technologies with NFC polling signal 112, but the responsive NFC signals 114 returned to the NFC short-range wireless interface 77 of the rechargeable battery-powered device 200, are discarded by gate 78, in accordance with example embodiments of the invention. The gate 78 is controlled by the NFC short-range wireless interface 77 to ignore the short-range wireless response signal 114 received from an external device, such as the short-range wireless device 100 when the rechargeable battery-powered device 200 is in a stand-by, low power, idle, or sleep mode state. This prevents information derived from the short-range wireless response signal 114 from interrupting the stand-by, low power, idle, or sleep mode state of the rechargeable battery-powered device 200 and reduces power consumption on the rechargeable battery-powered device 200.

The NFC short-range wireless polling signals 112 may comprise a sequence of RF signals in a plurality of discovery periods, each including a poll interval, a listen interval, and an idle interval. The NFC discovery technique used by the NFC interface 77 may comprise detection and collision resolution for the different technologies NFC-A, NFC-B and NFC-F. The total duration of one discovery period is where all listed discovery types, for example NFC-A, NFC-B, and NFC-F, will be executed in a specified frequency and order in consecutive, respective poll periods during the poll interval. The total duration of one discovery period or loop includes a poll interval and a listen interval, where the intervals are executed in the specified order. The discovery activity may be configured by the host device, the rechargeable battery-powered device 200, with a command to the NFC interface controller 77, which is used to configure some of discovery parameters. The remaining discovery parameters may be configured with a command that also starts the discovery operation by the NFC interface controller 77.

In accordance with an example embodiment of the invention, the NFC interface 77 of the rechargeable battery-powered device 200 transmits NFC short-range wireless polling signals 112 according to a first poll interval. The rechargeable battery-powered device 200 determines whether it is active, or in a stand-by, low power, idle, or sleep mode state. When the rechargeable battery-powered device 200 is determined to be in a stand-by, low power, idle, or sleep mode state, it controls the NFC interface 77 to enter into a special polling mode for transmitting NFC short-range wireless polling signals 112 according to a second poll interval that may be the same or different from the first poll interval. The NFC interface 77 enters the special mode where it polls for NFC tags and optionally it may increase the polling loop or reduce the tag technologies it polls for in order to save battery power of the rechargeable battery-powered device 200. The NFC interface 77 controls the gate 78 to ignore the short-range wireless response signal 114 received from the wireless charging device 100.

In accordance with an embodiment of the invention, when the rechargeable battery-powered device 200 is moved away from the wireless charging device 100, it causes a termination of the activation of the wireless charging device 100 in response to wireless charging device 100 no longer receiving the NFC short-range wireless polling signal 112. This results in causing the wireless charging device 100 to reduce its energy consumption by terminating its activation in response to the wireless charging device 100 no longer receiving the NFC short-range wireless polling signal 112.

Figure 1B:
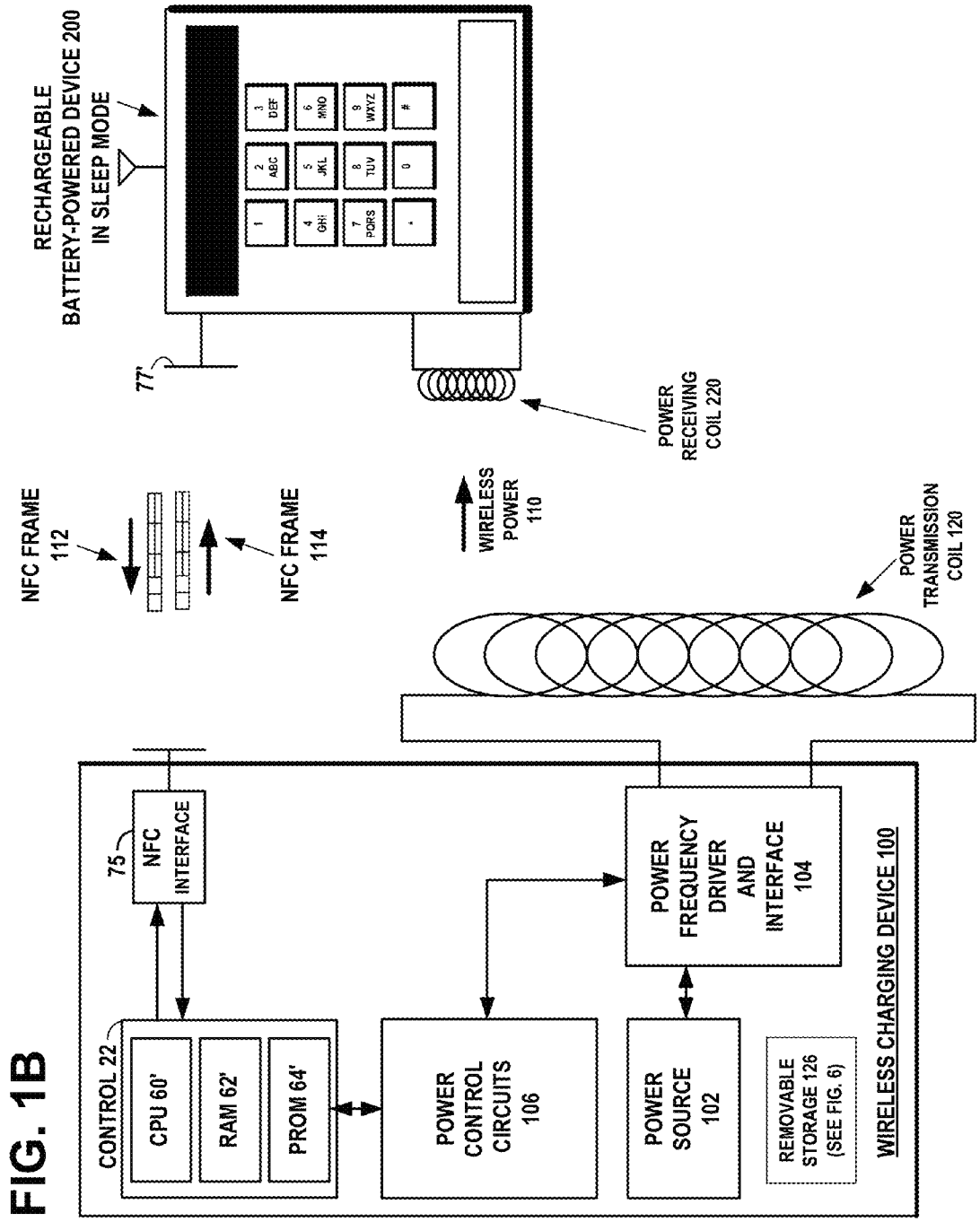
FIG. 1B illustrates the an example embodiment of FIG. 1A, showing the rechargeable battery-powered device in the special stand-by, low power, idle, or sleep mode state, wherein its NFC short-range wireless interface polls for NFC tag technologies from the wireless charging device, but the responsive NFC signals returned to the NFC short-range wireless interface of the rechargeable battery-powered device, are discarded, in accordance with example embodiments of the invention.

FIG. 1B illustrates an example embodiment of FIG. 1A, showing the rechargeable battery-powered device 200 in the stand-by, low power, idle, or sleep mode state, as evidenced by the blackout of its display screen. According to one embodiment of the present invention the NFC short-range wireless interface 77 of the rechargeable battery-powered device 200 is configured to poll, via its antenna 77', for NFC tag technologies from the wireless charging device 100 with NFC polling signal 112, but the responsive NFC signals 114 returned to the NFC short-range wireless interface 77, via its antenna 77', of the rechargeable battery-powered device 200, are discarded by the gate 78, in accordance with example embodiments of the invention.

In an example embodiment of the invention, the rechargeable battery-powered device 200 enters a specific polling mode while staying in a stand-by, low power, idle, or sleep mode state. In an example embodiment of the invention, the rechargeable battery-powered device 200 ignores the responsive data 114 being read by interface 77 from the near field communication tag 75, while in the stand-by, low power, idle, or sleep mode state. The stand-by, low power, idle, or sleep mode is not interrupted as a result of the tag 75 being read. In an example embodiment of the invention, the rechargeable battery-powered device 200 ignores the responsive data 114 being read by interface 77 from the near field communication tag 75, while in the stand-by, low power, idle, or sleep mode state, and does not forward the responsive data 114 to an operating system or high level software of the rechargeable battery-powered device 200. According to one embodiment, the NFC interface 75 may also be an NFC module capable of both reading tags and emulating a tag, similar to NFC interface 77.

The rechargeable battery-powered device 200 may be primarily a communications device, such as a cell phone, personal digital assistant (PDA), pager, Bluetooth™ headset, or the like. The rechargeable battery-powered device 200 may also be a personal computing device such as a laptop, palmtop, or tablet computer. The rechargeable battery-powered device 200 may also be an embedded micro-controller in an appliance, an engine control computer, a micro-controller in a digital TV, a micro-controller in a global positioning system (GPS) device, or the like. The rechargeable battery-powered device 200 may also be a video game console or a digital toy, such as a programmable robot.

In an example embodiment, a power source circuit 102 in the wireless charging device 100 drives a power frequency driver and interface 104 that produces a source alternating current in a frequency range between 50 kHz and 20 MHz through the power transmission coil 120, which will provide energy to recharge rechargeable batteries that would be located in the battery holder 216 of the rechargeable battery-powered device 200 during normal use. The power control circuits 106 control the power level output by the charger 100.

In an example embodiment, the power transmission coil 120 of the wireless charging device 100 may be brought near the rechargeable battery-powered device 200 to couple the magnetic flux with the power receiving coil 220, using contact-less electromagnetic induction. The contact-less electromagnetic induction may provide sufficient power to operate the rechargeable battery-powered device 200.

In an example embodiment, the power transmission coil 120 may be any suitable shape such as printed coil, multilayer coils, wired coils, and the like. In alternate embodiments, a separate printed wiring board 122 may be omitted and the coil 120 may incorporated into the body of the printed wiring board or it may be glued to a plastic substrate forming a charging plate. The power transmission coil 120 may have a relatively large area. The current carrying wires of the power transmission coil 120 generate magnetic field lines that form concentric circles of magnetic flux around the wires 120. The magnetic flux proximate to the power receiving coil 220 of the rechargeable battery-powered device 200, couples with the power receiving coil 220, using contact-less electromagnetic induction. The contact-less electromagnetic induction provides sufficient power to the relatively small power receiving coil 220, to charge rechargeable batteries that would be located in the battery holder 216 of the rechargeable battery-powered device 200 during normal use. The contact-less electromagnetic induction also provides sufficient power to operate the rechargeable battery-powered device 200.

FIG. 1A illustrates an example embodiment of the wireless charging device 100, in accordance with example embodiments of the invention. The control 22 may include a central processing unit (CPU) 60', random access memory (RAM) 62', and programmable read only memory (PROM) 64'. The PROM 64' may store programmed instructions.

In example embodiments of the invention, interface 77 of the rechargeable battery-powered device 200, may use a suitable short-range communications protocol, such as Bluetooth™, Radio Frequency Identification (RFID), Near Field Communication (NFC), Infrared Data Association (IrDA), Ultra Wide Band (UWB), or IEEE 802.11 WLAN, for example, that is respectively wirelessly coupled to a corresponding transceiver of the same type coupled to the software update server 55'.

An example of the Bluetooth™ out-of-band short-range carrier is described, for example, Bluetooth™ devices is described in the Bluetooth™ Specification, Version 4, Jun. 30, 2010, incorporated herein by reference.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in IrDA Link Access Protocol, v1.1 (1996), incorporated herein by reference.

An example of the Ultra Wide Band (UWB) out-of-band short-range carrier is described, for example, in WiMedia Common Radio Platform Specification, Version 1.5 (2010), incorporated herein by reference.

An example of the IEEE 802.11 WLAN out-of-band carrier is described, for example, in IEEE 802.11-2007, Wireless Medium Access Control (MAC) and Physical Layer (PHY) Specifications, June 2007 (incorporated herein by reference).

The control processor 20 may include the CPU 60, RAM 62, and PROM 64 that may be coupled to the control interface 205. The CPU 60 may be a dual processor or multi-processor. The PROM 64 may store programmed operations including, for example, a wake-up utility program, a query/response utility program, a software update utility program, a personalization utility program, and a parameter setting utility program. In an example embodiment, the control processor 20 may be embodied as a single integrated circuit semiconductor chip, known as a baseband system on chip. In an alternate example embodiment, the control processor 20 may be embodied as two or more integrated circuit semiconductor chips in a chip set. In an example embodiment, the PROM 64 may be a flash memory or other non-volatile computer storage chip that may be electrically erased and reprogrammed.

Figure 6:
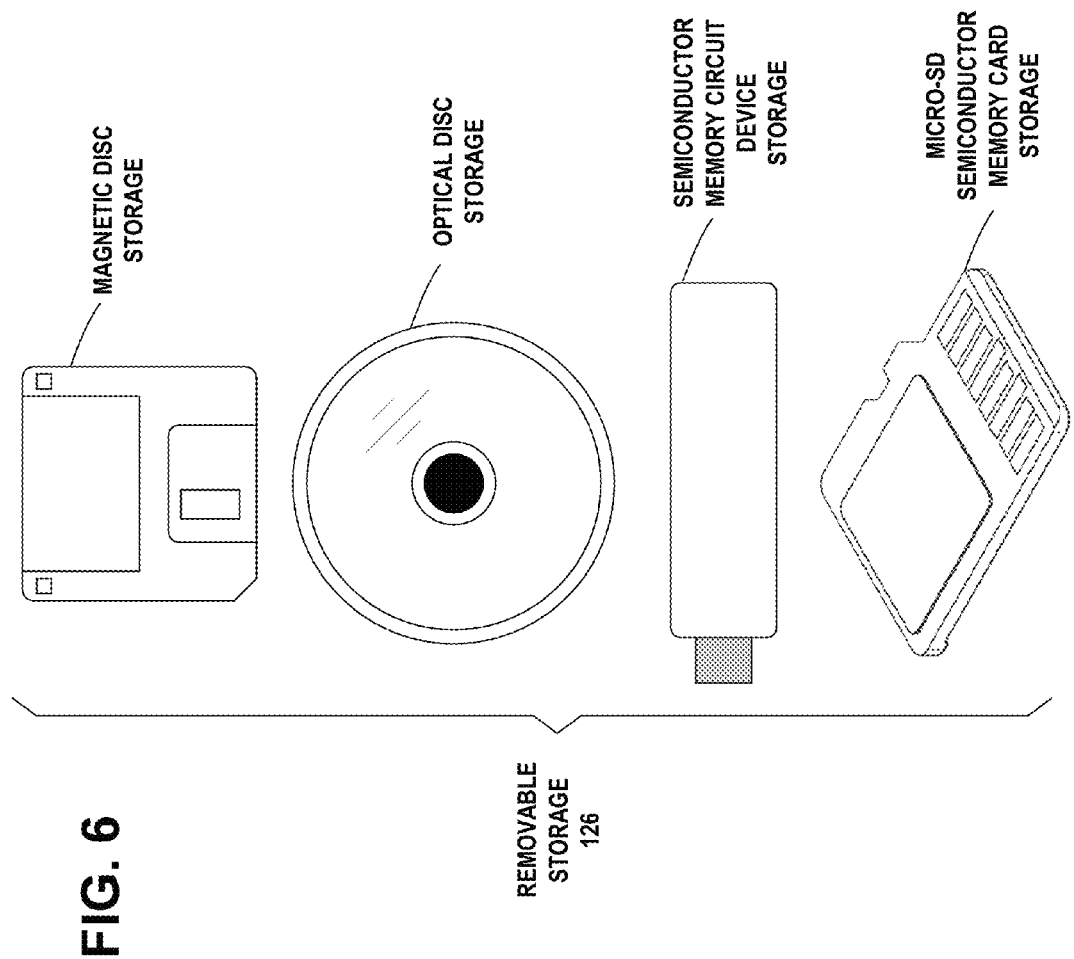
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Examples of removable storage media based on magnetic, electronic and/or optical technologies such as magnetic disks, optical disks, semiconductor memory circuit devices and micro-SD memory cards (SD refers to the Secure Digital standard) are shown at 126 and in FIG. 6, and may serve, for instance, as a data input/output means. Code may include any interpreted or compiled computer language including computer-executable instructions. The code and/or data may be used to create software modules such as operating systems, communication utilities, user interfaces, more specialized program modules, etc.

In an example embodiment where the rechargeable battery-powered device 200 may be primarily a communications device, such as for example a cell phone, PDA, pager, or Bluetooth™ headset, the control processor 20 may manage the communication functions of the rechargeable battery-powered device 200. Example communication functions may be radio control functions such as signal modulation, encoding, radio frequency shifting, and the like. These communication functions may be based on baseband programming instructions stored as firmware in the PROM 64. In accordance with an example embodiment of the invention, the baseband programming may be wirelessly updated and various settings stored in the control processor 20.

In an alternate example embodiment where the rechargeable battery-powered device 200 may be a laptop, palmtop, or tablet computer, or the like, the control processor 20 may be a microprocessor and its system software may be stored in the PROM 64 as firmware. In accordance with an example embodiment of the invention, the system software may be wirelessly updated and various settings stored in the PROM 64 and/or microprocessor.

In an alternate example embodiment where the rechargeable battery-powered device 200 may be an embedded micro-controller in an appliance, in an engine, in a digital TV, in a video game console, in a programmable robot, or the like, the control processor 20 may be the micro-controller and its system software may be stored in the PROM 64 as firmware. In accordance with an example embodiment of the invention, the system software may be wirelessly updated and various settings stored in the PROM 64 and/or micro-controller.

In an example embodiment of the invention, the control interface 205 in the rechargeable battery-powered device 200 may include stored information, for example, wake-up instructions that are output to the control processor 20 in response to detecting the received wireless power 110. The control interface 205 may provide the wake-up instructions to the control system 20, transceiver 12, and other needed components of the rechargeable battery-powered device 200.

FIGS. 2A and 2B illustrate an example flow diagram of example operational steps of an example embodiment of the method carried out by the rechargeable battery-powered device 200 of FIG. 1, according to an embodiment of the present invention. FIG. 2B shows the Branch 315 that includes steps 316, 318, 320A, 320B, and 322. The steps of FIGS. 2A and 2B may include:

Step 302: Start

Step 304: Battery-powered device 200, such as a mobile phone in Normal State—NFC interface is polling for tag technologies and other NFC peer to peer devices Step 306: Battery-powered device 200, such as mobile phone enters Stand-by Mode because a timeout has elapsed or the user has locked the screen or for any other reason.

Step 308: Is an embodiment implemented having the special polling mode?

No:

Step 310: NFC interface of the battery-powered device 200, such as mobile phone enters standby mode.

Step 312: The mobile phone is placed on top of the wireless charging device and the NFC interface does NOT poll for tags.
Step 314: Wireless charging device can start only upon user interaction. (e.g. the user unlocks the mobile phone and exits stand-by mode while keeping the device on the wireless charging device docking or the user manually starts the wireless charging device).
Yes: (Go To Branch 315 in FIG. 2B)
Step 316: NFC interface of the battery-powered device 200, such as mobile phone enters a special mode where it polls for NFC tags and optionally it may increase the polling loop or reduce the tag technologies it polls for in order to save battery.
Step 318: The battery-powered device 200, such as mobile phone is placed on top of the wireless charging device and NFC tag 75 excitation is triggered, inducing current in the NFC tag 75, causing the wireless charging device 100 to respond by providing wireless power 110.
Step 320: The received tag content 114 is blocked by the gate 78 from being delivered to the controller 20 in the battery-powered device 200 and thus, the battery-powered device 200, such as mobile phone can continue staying in sleep mode.
Step 322: Wireless charging device starts without user interaction and with the minimum possible power consumption (on the wireless charging device side). In fact the wireless charging device may initially be completely off.
Step 324: Wireless charging can be automatically stopped as soon as the battery-powered device 200, such as mobile phone is removed from the charger and tag is not read anymore.

FIG. 3 illustrates an example embodiment of the near field communication polling signal sequence for message frames 112 transmitted by the NFC interface 77 of FIG. 1A, in accordance with example embodiments of the invention.

In an example embodiment of the invention, the NFC interface 77 may be embodied as hardware, software, firmware, or a combination of these constructs. It may be an integral part of the host device 200 or it may be an integrated circuit chip or card physically attached to the host device 200, such as with a flash card adapter. In an example embodiment of the NFC interface 77, may include a processor, a read only memory (ROM), and random access memory (RAM). The NFC interface 77 may include an NFC radio or the NFC radio may be separately connected. The NFC interface 77 may include its own battery or it may use power supplied by the host device 200. The ROM and/or RAM may be a removable memory device such as a smart card, SIM, WIM, semiconductor memory such as RAM, ROM, PROMS, flash memory devices, etc.

In an example embodiment of the invention, NCI firmware in the NFC interface 77 of the rechargeable battery-powered device 200 communicates bidirectionally with the NFC interface 75 of the wireless charging device 100 via magnetic field induction, where two loop antennas are located within each other's near-field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The user may bring the NFC radio on the NFC interface 77 close to the NFC interface 75 of the wireless charging device 100 to allow near-field, bidirectional communication between the devices. NFC technology is an extension of the ISO/IEC 14443 proximity-card standard for contactless smartcards and radio frequency ID (RFID) devices, which combines the interface of a contactless smartcard and a reader into a single device, and uses the ISO/IEC 18092 NFC communication standard to enable two-way communication. An NFC radio may communicate with both existing ISO/IEC 14443 contactless smartcards and readers, as well as with other NFC devices by using ISO/IEC 18092.

In an example embodiment of the invention, when two NFC interfaces 77 and 75 are brought into close proximity, they may establish NFC communication based on the NFC Forum Logical Link Control Protocol (LLCP) specification. In example embodiments of the invention, the NFC interface 77 may be a contactless smartcard reader having characteristics similar to those described in the ISO/IEC 14443 proximity-card standard, the smartcard and reader being associated or combined as a single component capable of two-way communication, and may use the ISO/IEC 18092 NFC communication standard.

In an example embodiment of the invention, NFC discovery RF signal sequences may be exchanged between the two NFC interfaces 77 and 75 of FIG. 1A, each sequence of RF signals comprising a poll interval, a listen interval, and an idle interval.

NFC supports at least three different technologies NFC-A, NFC-B and NFC-F, and thus there may be separate poll periods for each technology in the poll interval. However, all of these technologies may be simultaneously detected in the listen interval. An example command from the host device 200 to the NFC interface 77 to initiate the discovery of targets in the field, may specify four consecutive poll periods for NFC-A, NFC-B, NFC-F, and point-to-point (P2P) in the poll interval. This may be followed by the listen interval during which polling signals may be simultaneously detected from another NFC device in any of the three technologies, NFC-A, NFC-B, or NFC-F.

FIG. 3 is an example embodiment of an NFC discovery RF signal sequence exchanged between the two NFC interfaces 77 and 75 of FIG. 1A, each sequence of RF signals comprising a poll interval, a listen interval, and an idle interval. The three different technologies NFC-A, NFC-B and NFC-F, may be transmitted in separate, respective poll periods for each technology in the poll interval. The format of the NFC discovery period may also include specifying a periodic skipping of polling for certain NFC technologies. For example, NFC-A is polled in every discovery period, NFC-B is polled in every second discovery period, and NFC-F in every third discovery period. The three different technologies NFC-A, NFC-B and NFC-F, may be detected simultaneously in the listen interval, according to an embodiment of the present invention.

FIG. 4A is an example flow diagram 400 of example operational steps of an example embodiment of the method carried out by the rechargeable battery-powered device 200 of FIG. 1, according to an embodiment of the present invention. The steps of the flow diagram represent computer code instructions stored in the RAM and/or PROM memory of the wake-up and control interface, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 402: transmitting, by a device, short-range wireless polling signals via a short-range wireless interface according to a first poll interval;

Step 404: determining whether the device is active, or in a stand-by, low power, idle, or sleep mode state;

Step 406: when the device is determined to be in a stand-by, low power, idle, or sleep mode state, causing the device to enter into a polling mode for transmitting short-range wireless polling signals via a short-range wireless interface according to a second poll interval that may be the same or different from the first poll interval and ignoring received short-range wireless response signals.

FIG. 4B is an example flow diagram 450 of example operational steps of an example embodiment of the method carried out by the wireless charging device 100 of FIG. 1, according to an embodiment of the present invention. The steps of the flow diagram represent computer code instructions stored in the RAM and/or PROM memory of the wake-up and control interface, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 452: receiving a short-range wireless polling signal via a short-range wireless interface;

Step 454: initiating transmission of wireless power in response to the receipt of the short-range wireless polling signal.

Figure 5:
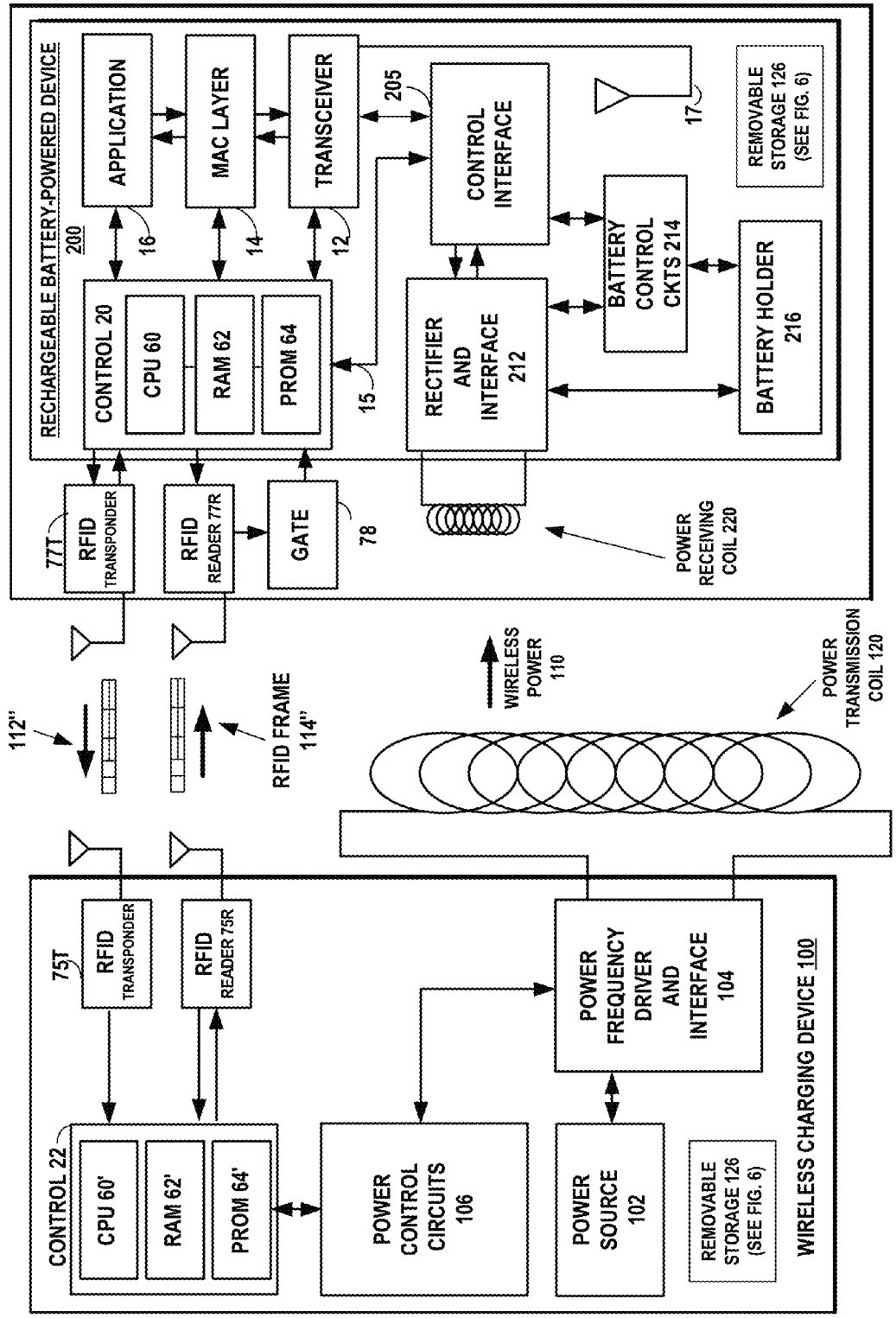
FIG. 5 illustrates an example embodiment of a rechargeable battery-powered device equipped with an RFID short-range wireless interface, transmitting an RFID short-range wireless signal to a wireless charging device equipped with its own RFID short-range wireless interface, to trigger the wireless charging device to provide power to the rechargeable battery-powered device, wherein the rechargeable battery-powered device has entered a special stand-by, low power, idle, or sleep mode state wherein its RFID short-range wireless interface polls for an RFID tag from the wireless charging device, but the responsive RFID signals returned to the RFID short-range wireless interface of the rechargeable battery-powered device, are discarded, in accordance with example embodiments of the invention.

FIG. 5 illustrates an example embodiment of a rechargeable battery-powered device 200 equipped with an RFID short-range wireless interface, the RFID reader 77R, transmitting an RFID short-range wireless signal 112" to a wireless charging device 100 equipped with its own RFID short-range wireless interface, the RFID transponder 75T. The RFID short-range wireless signal 112" triggers the wireless charging device 100 to provide wireless power 110 to the rechargeable battery-powered device 200. The rechargeable battery-powered device 200 has entered a special sleep mode state wherein its RFID short-range wireless interface, the RFID reader 77R, polls for an RFID tag from the wireless charging device 100 with the RFID frame 112", but the responsive RFID signals 114" returned from the RFID transponder 75T to the RFID reader 77R of the rechargeable battery-powered device 200, are discarded by the gate 78, in accordance with example embodiments of the invention.

In an example embodiment of the invention, the rechargeable battery-powered device 200 enters the special mode when polling state for RFID tag signals while staying in a stand-by, low power, idle, or sleep mode state. In an example embodiment of the invention, the rechargeable battery-powered device 200 ignores the responsive data 114" being read by RFID reader 77R from the RFID tag 75T, while in the stand-by, low power, idle, or sleep mode state. The stand-by, low power, idle, or sleep mode is not interrupted as a result of the tag 75T being read. In an example embodiment of the invention, the rechargeable battery-powered device 200 ignores the responsive data 114" being read by RFID reader 77R from the RFID tag 75T, while in the stand-by, low power, idle, or sleep mode state, and does not forward the responsive data 114" to an operating system or high level software of the rechargeable battery-powered device 200.

In an example embodiment of the invention, rechargeable battery-powered device 200 with a radio frequency identification (RFID) circuit 77R, provides RFID messages RFID frame 112" to the wireless charging device 100 to activate the charging device 100 to provide power to the rechargeable battery-powered device 200, in accordance with example embodiments of the invention.

In example embodiments of the invention, the RFID transponder 75T and the RFID reader 75R as shown in FIG. 5, may be associated or combined as a single interface. The RFID transponder 75T and RFID reader 75R may be capable of two-way communication, according to an embodiment of the present invention. The rechargeable battery-powered device 200 may contain an RFID transponder 77T and an RFID reader 77R, as shown in FIG. 5, which may be associated or combined as a single interface.

The RFID reader 77R of rechargeable battery-powered device 200 may within range of the wireless charging device 100 to transmit an RFID frame 112" to the RFID transponder 75T of the wireless charging device 100. The RFID frame 112" may provide sufficient power to activate the wireless charging device 100.

RFID transponders may be the passive type or the active type. A passive RFID transponder 75T requires no internal power source to communicate with the RFID reader 77R, and is only active when it is near an RFID reader 77R, which energizes the transponder 75T with a continuous radio frequency signal at a resonant frequency of the transponder's antenna. The small electrical current induced in the transponder's antenna by the continuous radio frequency signal provides enough power for the integrated circuit in the transponder to power up and transmit a modulated response, typically by backscattering the continuous carrier wave received from the RFID reader 77R. A passive RFID transponder 75T may include writable electrically erasable, programmable, read-only memory (EEPROM) for storing data received from the RFID reader 77R, which modulates the continuous carrier wave sent by the RFID reader 77R. The RFID transponder 75T of the wireless charging device 100 may pass the information in the RFID frame 112" to control 22.

Load modulation may be used by the RFID transponder 75T of the wireless charging device 100 to transmit information back to the RFID reader 77R of the rechargeable battery-powered device 200. No battery power may be required by the RFID transponder 75T in using load modulation for communication back to the RFID reader 77R.

Reading distances for passive RFID transponders typically range from a few centimeters to a few meters, depending on the radio frequency and antenna design. By contrast, active RFID transponders require a power source to receive and transmit information with an RFID reader. The RFID transponder 75T may be a passive transponder affixed to the wireless charging device 100. The user may bring the RFID reader 77R close to the RFID transponder 75T to allow RFID communication between the devices.

In accordance with an embodiment of the invention, the user may control via e.g. a user interface, a basic setting as to whether the device will be in this special polling mode when in idle mode. In this manner, in addition to already existing "NFC on" selection by the user, there may be an additional user selection as to whether this "NFC active in idle mode" is selected or not.

FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   transmitting, by a polling device, short-range wireless polling signals via a near field communication (NFC) or radio frequency identification (RFID) communication short-range wireless interface according to a first poll interval, and receiving short-range wireless response signals from responding devices responding to the short-range wireless polling signals;
   determining, by the polling device, whether the polling device is in an active mode or in an inactive mode, wherein the inactive mode comprises at least one of a stand-by mode, low power mode, idle mode, or sleep mode state;
   when the polling device is determined to be in the inactive mode, causing the polling device to enter into a polling mode for transmitting short-range wireless polling signals via the short-range wireless interface according to a second poll interval that may be the same or different from the first poll interval, if the polling device is receptive to being charged by a wireless charger near to the polling device; and
   discarding, by the polling device, received short-range wireless response signals from responding devices responding to the short-range wireless polling signals having the second poll interval, so that polling response signals received from a nearby wireless charger, do not activate an operating system of the polling device.

2. The method of claim 1, further comprising:
   preventing information derived from the received short-range wireless response signal from interrupting the stand-by, low power, idle, or sleep mode state.

3. The method of claim 1, further comprising:
   receiving wireless power in response to transmission of the short-range wireless polling signals via the short-range wireless interface.

4. The method of claim 1, further comprising:
   causing the device to enter into a polling mode for transmitting short-range wireless polling signals via the short-range wireless interface, having at least one of a lengthened polling interval and a reduced number of tag technologies being polled, when the device is determined to be in the stand-by, low power, idle, or sleep mode state.

5. The method of claim 1, wherein the short-range wireless polling signal is one of a near field communication signal or a radio frequency identification signal.

6. An apparatus, comprising:
   at least one processor;
   at least one memory including computer program code;
   the at least one memory and the computer program code configured to, with the at least one processor, cause the apparatus at least to:
   transmit short-range wireless polling signals via a near field communication (NFC) or radio frequency identification (RFID) communication short-range wireless interface according to a first poll interval, and receive short-range wireless response signals from responding devices responding to the short-range wireless polling signals;
   determine whether the apparatus is in an active mode or in an inactive mode, wherein the inactive mode comprises at least one of a stand-by mode, low power mode, idle mode, or sleep mode state;
   when the apparatus is determined to be in the inactive mode, cause the apparatus to enter into a polling mode for transmitting short-range wireless polling signals via the short-range wireless interface according to a second poll interval that may be the same or different from the first poll interval, if the apparatus is receptive to being charged by a wireless charger near to the apparatus; and
   discarding received short-range wireless response signals from responding devices responding to the short-range wireless polling signals having the second poll interval, so that polling response signals received from a nearby wireless charger, do not activate an operating system of the apparatus.

7. The apparatus of claim 6, further comprising:
   the at least one memory and the computer program code configured to, with the at least one processor, cause the apparatus at least to:
   prevent information derived from the received short-range wireless response signal from interrupting the stand-by, low power, idle, or sleep mode state.

8. The apparatus of claim 6, further comprising:
   the at least one memory and the computer program code configured to, with the at least one processor, cause the apparatus at least to:
   receive wireless power in response to transmission of the short-range wireless polling signals via the short-range wireless interface.

9. The apparatus of claim 6, further comprising:
   the at least one memory and the computer program code configured to, with the at least one processor, cause the apparatus at least to:
   cause the apparatus to enter into a polling mode for transmitting short-range wireless polling signals via the short-range wireless interface, having at least one of an lengthened polling interval and a reduced number of tag technologies being polled, when the device is determined to be in the stand-by, low power, idle, or sleep mode state.

10. The apparatus of claim 6, further comprising:
    wherein the short-range wireless polling signal is one of a near field communication signal or a radio frequency identification signal.

11. A computer program product comprising computer executable program code recorded on a computer readable non-transitory storage medium, the computer executable program code comprising:

code for transmitting, by a polling device, short-range wireless polling signals via a near field communication (NFC) or radio frequency identification (RFID) communication short-range wireless interface according to a first poll interval, and receiving short-range wireless response signals from responding devices responding to the short-range wireless polling signals;

code for determining, by the polling device, whether the polling device is in an active mode or in an inactive mode, wherein the inactive mode comprises at least one of a stand-by mode, low power mode, idle mode, or sleep mode state;

code for when the polling device is determined to be in the inactive mode, causing the polling device to enter into a polling mode for transmitting short-range wireless polling signals via the short-range wireless interface according to a second poll interval that may be the same or different from the first poll interval, if the polling device is receptive to being charged by a wireless charger near to the polling device; and code for discarding, by the polling device, received short-range wireless response signals from responding devices responding to the short-range wireless polling signals having the second poll interval, so that polling response signals received from a nearby wireless charger, do not activate an operating system of the polling device.

* * * * *